United States Patent Office 3,312,592
Patented Apr. 4, 1967

3,312,592
ADMINISTRATION OF 1,4-BENZODIOXAN DERIVATIVES TO PRODUCE BETA - ADRENERGIC BLOCKADE
Madhukar Subraya Chodnekar, Albert Frederick Crowther, and Ralph Howe, Macclesfield, England, assignors to Imperial Chemical Industries Limited, London, England, a corporation of Great Britain
No Drawing. Filed Jan. 31, 1964, Ser. No. 341,751
Claims priority, application Great Britain, Feb. 13, 1963, 5,902/63
7 Claims. (Cl. 167—65)

This invention relates to pharmaceutical compositions and more particularly it relates to pharmaceutical compositions containing 1,4-benzodioxan derivatives which possess useful therapeutic properties.

Certain 1-(1,4-benzodioxan-2-yl)-2-aminoethanol derivatives are known, but it was not known heretofore that compounds of this type possess β-adrenergic blocking activity. We have now found that compounds of this type possess this activity and they are therefore useful for the treatment or prophylaxis or coronary artery disease.

According to the invention we provide pharmaceutical compositions comprising at least one 1,4-benzodioxan derivative of the formula:

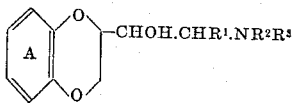

$$-CHOH.CHR^1.NR^2R^3$$

wherein $R^1$ stands for hydrogen or a lower alkyl radical, $R^2$ stands for hydrogen or an alkyl radical, $R^3$ stands for hydrogen or an alkyl, cycloalkyl, alkenyl or aralkyl radical, any of which may optionally be substituted, or wherein $R^2$ and $R^3$ are joined together with the adjacent nitrogen atom to form a heterocyclic radical, optionally substituted, and wherein the benzene ring A may optionally be substituted, and/or at least one ester thereof, and/or at least one salt thereof, together with a pharmaceutically-acceptable diluent or carrier.

It is to be understood that the above formula encompasses all possible stereoisomeric forms of the said 1,4-benzodioxan derivatives and mixtures thereof. The said 1,4-benzodioxan derivatives contain within their molecules at least two centres of asymmetry. Each derivative exists therefore in at least two diastereoisomeric forms, each of which is a racemic mixture. The racemic diastereoisomers can be separated from each other by conventional means, for example by fractional crystallisation.

As a suitable value for $R^1$ when it stands for a lower alkyl radical there may be mentioned an alkyl radical of not more than 6 carbon atoms, for example the methyl radical.

As a suitable value for $R^2$ when it stands for an alkyl radical there may be mentioned, for example, an alkyl radical of not more than 6 carbon atoms, for example the methyl, ethyl or isopropyl radical.

As a suitable value for $R^3$ when it stands for an alkyl radical there may be mentioned, for example, an alkyl radical of not more than 10 carbon atoms, for example the ethyl, n-propyl, isopropyl, n-butyl, isobutyl, s-butyl, t-butyl or 1-methylbutyl radical. As a suitable value for $R^3$ when it stands for a substituted alkyl radical there may be mentioned, for example, an alkyl radical of not more than 10 carbon atoms bearing one or more hydroxy or alkoxy radicals, for example alkoxy radicals of not more than 5 carbon atoms, for example the methoxy radical. As a suitable value for $R^3$ when it stands for an aralkyl radical, optionally substituted, there may be mentioned, for example, an aralkyl radical of not more than 15 carbon atoms, optionally substituted with, for example, one or more halogen atoms, for example chlorine atoms, or alkoxy radicals, for example alkoxy radicals of not more than 5 carbon atoms, for example the methoxy radical. Thus, specific values for $R^3$ when it stands for a substituted alkyl radical or an aralkyl or substituted aralkyl radical are the 2-hydroxyethyl, 2-hydroxy-1,1-dimethylethyl, 3-methoxypropyl, 1,1-dimethyl-2-phenylethyl, 1-methyl-3-phenylpropyl, 3 - (4 - chlorophenyl)-1,1-dimethylpropyl, 2 - (3,4 - dimethoxyphenyl) ethyl or 2 - methoxy - 2 - (3 - methoxyphenyl) ethyl radical. As a suitable value for $R^3$ when it stands for a cycloalkyl radical there may be mentioned, for example, a cycloalkyl radical of not more than 10 carbon atoms, for example the cyclopentyl radical. As a suitable value for $R^3$ when it stands for an alkenyl radical there may be mentioned, for example, an alkenyl radical of not more than 10 carbon atoms, for example the allyl radical.

As a suitable value for the group $—NR^2R^3$ when it stands for a heterocyclic radical, optionally substituted, there may be mentioned, for example, a 5- or 6-membered nitrogen-containing heterocyclic radical, optionally substituted, for example the pyrrolidino, piperidino, piperazino or morpholino radical.

As suitable optional additional substituents in the benzene ring (A) there may be mentioned, for example, one or more halogen atoms, for example one or more chlorine or bromine atoms, or one or more alkyl radicals of not more than 6 carbon atoms, for example one or more methyl or ethyl radicals, or one or more hydroxy radicals, or the group $—CH=CH—CH=CH—$ which together with the group $=CH—CH=$ of ring A forms a benzene ring.

1,4-benzodioxan derivatives which are useful as active ingredients in the pharmaceutical compositions of the invention include, for example, the known compounds 1-(1,4-benzodioxan-2-yl)-2-ethylaminoethanol,
1-(1,4-benzodioxan-2-yl)-2-diethylaminoethanol,
1-(1,4-benzodioxan-2-yl)-2-n-propylaminoethanol,
1-(1,4-benzodioxan-2-yl)-2-isoproylaminoethanol,
1-(1,4-benzodioxan-2-yl)-2-pyrrolidinoethanol,
2-amino-1-(1,4-benzo-dioxan-2-yl)propan-1-ol,
1-(1,4-benzodioxan-2-yl)-2-ethylaminopropan-1-ol,
1-(1,4-benzodioxan-2-yl)-2-diethylaminopropan-1-ol,
1-(1,4-benzodioxan-2-yl)-2-cyclopentylaminopropan-1-ol
and
1-(1,4-benzodioxan-2-yl)-2-pyrrolidinopropan-1-ol, and the new compounds described and claimed in our co-pending application No. 5,901/63. The said new compounds may be obtained as described in the said co-pending application. Particularly active compounds which are therefore particularly valuable as active ingredients include, for example, 1-(1,4-benzodioxan-2-yl)-2-isopropylaminoethanol,
1-(1,4-benzodioxan-2-yl)-2-t-butylaminoethanol,
1-(1,4-benzodioxan-2-yl)-2-(2-hydroxy-1,1-dimethylethylamino)ethanol,
1-(1,4-benzodioxan-2-yl)-2-(1,1-dimethyl-2-phenylethylamino)ethanol,
1-(1,4-benzodioxan-2-yl)-2-(1-methyl-3-phenylpropylamino)ethanol,
1-(6- or 7-bromo-1,4-benzodioxan-2-yl)-2-t-butylaminoethanol,
1-(1,4-benzodoxan-2-yl)-2-s-butylaminoethanol,
1-(1,4-benzodioxan-2-yl)-2-isopropylaminopropan-1-ol,
1-(1,4-benzodiozan-2-yl)-2-n-butylaminopropan-1-ol and
1 - (1,4-benzodioxan-2-yl)-2-t-butylaminoethyl benzoate,
and the salts thereof.

As suitable esters of the said 1,4-benzodioxan derivatives there may be mentioned, for example, O-etsers derived from carboxylic acids, for example aliphatic or aromatic carboxylic acids, for example aliphatic carboxylic acids of not more than 20 carbon atoms, for example acetic acid, or aromatic carboxylic acids of not more than 11 carbon atoms, for example benzoic acid, and the salts thereof.

As suitable salts of the said 1,4-benzodioxan derivatives there may be mentioned acid-addition salts, for example salts derived from inorganic acids, for example hydrochlorides, hydrobromides, phosphates or sulphates, or salts derived from organic acids, for example oxalates, lactates, tartrates, acetates, salicylates or citrates.

The pharmaceutical compositions of the invention may, for example, be in the form of tablets, capsules, aqueous or oily solutions, aqueous or oily suspensions, emulsions, sterile injectable aqueous or oily solutions or suspensions, or dispersible powders.

Suitable tablets may be formulated by admixture of the active ingredients(s) with known pharmaceutical excipients, for example inert diluents, for example calcium carbonate, calcium phosphate, lactose or mannitol, disintegrating agents, for example maize starch or alginic acid, binding agents, for example starch, gelatin or acacia mucilage, and lubricating agents, for example magnesium stearate, stearic acid or talc. Such tablets may optionally be coated by known techniques in order to delay disintegration in the stomach and thus to provide a sustained action over an extended period.

The aqueous suspensions, emulsions, oily solutions and suspensions of the invention generally contain a sweetening agent, for example glycerol, dextrose, sucrose or saccharin, and a flavouring agent, for example vanillin or orange extract, in order to provide a palatable product. The aqueous suspensions of the invention may also contain suitable suspending or thickening agents, for example sodium carboxymethylcellulose, wetting agents, for example condensation products of fatty alcohols with ethylene oxide, and preservatives, for example methyl or propyl p-hydroxybenzoate.

The emulsions of the invention may contain the active ingredient(s) dissolved in an oil of vegetable or animal origin, for example arachis oil or cod liver oil, and may also contain emulsifying agents and dispersing agents, for example soya bean lecithin, polyoxyethylene sorbitan mono-oleate, gum acacia, gum tragacanth or casein, and preservatives, for example methyl or propyl p-hydroxybenzoate, and anti-oxidants, for example propyl gallate.

The oily solutions of the invention likewise contain the active ingredient(s) in solution in an oil of vegetable or animal origin, and may optionally contain flavouring agents to mask any taste and improve oral acceptability. Such oily solutions may advantageously be filled into soft gelatin capsules. The oily solutions which contain sweetening agents, for example icing sugar, as described hereinbefore, may in addition contain a suspending agent, for example beeswax, to maintain the redispersion properties of the suspension.

Oral compositions in the form of gelatin capsules may consist of capsules containing the active ingredient(s) only, or the capsules may contain the active ingredient(s) in admixture with inert diluents, for example lactose or sorbitol.

The sterile injectable aqueous suspensions of the invention may contain a suspending or thickening agent, for example sodium carboxymethylcellulose, and a wetting or dispersing agent, for example a phenol-polyethylene oxide condensate, for example the condensation product of octylcresol with 8–10 molecular proportions of ethylene oxide. The sterile injectable oily solutions of the invention may be prepared from a non-toxic injectable fat or oil, for example arachis oil or ethyl oleate, and they may additionally contain gelling agents, for example aluminium stearate, to delay absorption within the body. These aqueous and oily injectable preparations may contain preservatives such as methyl or n-propyl p-hydroxybenzoate, or chlorobutanol.

The invention is illustrated but not limited by the following examples in which the parts are by weight. Where no method for preparing a particular active ingredient is described, the preparation of the compound in question is either known or it is described in our co-pending application No. 5,901/63.

Example 1

A mixture of 25 parts of 1-(1,4-benzodioxan-2-yl)-2-isopropylaminoethanol (M.P. 88–89° C.), 125 parts of maize starch, 270 parts of calcium phosphate and 1 part of magnesium stearate is compressed, and the compressed mixture is then broken down into granules by passage through a 16-mesh screen. The resultant granules are then compressed into tablets according to the known art. There are thus obtained tablets suitable for therapeutic purposes.

The above procedure is repeated except that the 1-(1,4-benzodioxan-2-yl)-2-isopropylaminoethanol of M.P. 88–89° C. is replaced by 1-(1,4-benzodioxan-2-yl)-2-t-butylaminoethanol or by 1-(1,4-benzodioxan-2-yl)-2-(2-hydroxy-1,1-dimethylethylamino)ethanol. There are thus obtained tablets suitable for therapeutic purposes.

The 1-(1,4-benzodioxan-2-yl)-2-isopropylaminoethanol of M.P. 88–89° C. may be obtained as follows:

A mixture of 20 parts of 1-(1,4-benzodioxan-2-yl)-2-chloroethanol and 126 parts of isopropylamine is heated in a sealed vessel at 100–110° C. for ten hours, and then the excess of isopropylamine is evaporated. The residual oil is shaken together with 300 parts of 2 N-hydrochloric acid and 200 parts of ether. The mixture is separated and 100 parts of 8 N-sodium hydroxide solution are added to the aqueous layer. The resulting mixture is extracted three times, each time with 200 parts of ether. The combined ethereal extracts are washed three times, each time with 100 parts of water, and then dried with anhydrous magnesium sulphate. The ether is evaporated and the residue is fractionally crystallised from light petroleum (B.P. 40–60° C.), the mother liquors from these crystallisations being retained for further examination. There is thus obtained one pure racemate of 1-(1,4-benzodioxan-2-yl)-2-isopropylaminoethanol, M.P. 88–89° C. This base (in "Nujol"—"Nujol" is a trademark) is characterised by an absorption band at 1071 cm.$^{-1}$ and by the absence of a band at 1081 cm.$^{-1}$. The hydrochloride corresponding to this base may be prepared by conventional means, and melts at 180–181° C. (crystallised from a mixture of methanol and ethyl acetate).

The combined mother liquors retained as described above are concentrated and, on cooling, a crystalline solid melting at about 50° C. slowly separates. This solid, which consists largely of the second racemate of 1-(1,4-benzodioxan-2-yl)-2-isopropylaminoethanol, is dissolved in 40 parts of ether, and ethereal hydrogen chloride is added until the separation of solid is substantially complete. The mixture is filtered and the solid residue is crystallised from a mixture of methanol and ethyl acetate. There is thus obtained the hydrochloride, M.P. 144–145° C., of the second racemate of 1-(1,4-benzodioxan-2-yl)-2-isopropylaminoethanol. This hydrochloride is converted into the corresponding base by conventional means and there is thus obtained the second pure racemate of 1-(1,4-benzodioxan-2-yl)-2-isopropylaminoethanol, M.P. 56–57° C. This base (in "Nujol") is characterised by an absorption band at 1081 cm.$^{-1}$ and by the absence of a band at 1071 cm.$^{-1}$.

Example 2

10 parts of 1-(1,4-benzodioxan-2-yl)-2-isopropylaminoethanol hydrochloride (M.P. 180–181° C.), 80 parts of mannitol and 5 parts of calcium phosphate are mixed together. A 10% solution of gelatin in water is added until the consistency of the mixture is such that it may readily be granulated by passage through a 20-mesh sieve. The granules thus obtained are dried and are then passed through a 30-mesh sieve. 1 part of stearic acid and 0.5 part of magnesium stearate are passed through a 60-mesh sieve and then added to the granules. The mixture is compressed into tablets, and there are thus obtained tablets which are suitable for oral use for therapeutic purposes.

The 1-(1,4-benzodioxan-2-yl)-2-isopropylaminoethanol hydrochloride of M.P. 180–181° C. is replaced by 1-(1,4-benzodioxan-2-yl)-2-isopropylaminoethanol hydrochloride (M.P. 144–145° C.), 1-(1,4-benzodioxan-2-yl-)-2-t-butylaminoethanol hydrochloride (M.P. 162–163° C.), 1-(1,4-benzodioxan-2-yl)-2-t-butylaminoethanol hydrochloride (M.P. 193–194° C.), 1-(1,4-benzodioxan-2-yl)-2-ethylaminoethanol, 1-(1,4-benzodioxan-2-yl)-2-diethylaminoethanol, 1-(1,4-benzodioxan-2-yl)-2-n-propylaminoethanol, 1-(1,4-benzodioxan-2-yl)-2-pyrrolidinoethanol, 2-amino-1-(1,4-benzodioxan-2-yl)propan-1-ol, 1-(1,4-benzodioxan-2-yl)-2-ethylaminopropan-1-ol, 1-(1,4-benzodioxan-2-yl)-2-diethylaminopropan-1-ol, 1-(1,4-benzodioxan-2-yl)-2-cyclopentylaminopropan-1-ol, 1-(1,4-benzodioxan-2-yl)-2-(2-hydroxy-1,1-dimethylethylamino)ethanol, 1-(1,4-benzodioxan-2-yl)-2-(1,1-dimethyl-2-phenylethylamino)-ethanol, 1-(1,4-benzodioxan-2-yl)-2-(1-methyl-3-phenylpropylamino)ethanol, 1-(6- or 7-bromo-1,4-benzodioxan-2-yl)-2-t-butylaminoethanol, 1-(1,4-benzodioxan-2-yl)-2-s-butylaminoethanol, 1-(1,4-benzodioxan-2-yl)-2-isopropylaminopropan-1-ol, 1-(1,4-benzodioxan-2-yl)-2-n-butylaminopropan-1-ol or 1-(1,4-benzodioxan-2-yl)-2-t-butylaminoethyl benzoate, and in a similar manner there are obtained tablets which are suitable for oral use for therapeutic purposes.

*Example 3*

89 parts of spray-dried lactose are passed through a 60-mesh sieve, and then mixed with 5 parts of maize starch and 1 part of magnesium stearate. The mixture is passed through a 60-mesh sieve, and then thoroughly mixed with 5 parts of 1-(1,4-benzodioxan-2-yl)-2-isoproylaminoethanol hydrochloride (M.P. 180–181° C.). The mixture is passed through a 60-mesh sieve, and then compressed into tablets according to the known art. There are thus obtained tablets which are suitable for oral use for therapeutic purposes.

The 1-(1,4-benzodioxan-2-yl)-2-isopropylaminoethanol hydrochloride of M.P. 180–181° C. is replaced by 1-(1,4-benzodioxan-2-yl)-2-isopropylaminoethanol hydrochloride (M.P. 144–145° C.), or by 1-(1,4-benzodioxan-2-yl)-2-t-butylaminoethanol hydrochloride (M.P. 162–163° C.), or by 1-(1,4-benzodioxan-2-yl)-2-t-butylaminoethanol hydrochloride (M.P. 193–194° C.), and in a similar manner there are obtained tablets which are suitable for oral use for therapeutic purposes.

*Example 4*

A mixture of 5 parts of 1-(1,4-benzodioxan-2-yl)-2-isopropylaminoethanol hydrochloride (M.P. 180–181° C.) and 150 parts of maize starch is filled into hard gelatine capsules. The composition so obtained is suitable for oral use for therapeutic purposes.

The 1-(1,4-benzodioxan-2-yl)-2-isopropylaminoethanol hydrochloride of M.P. 180–181° C. is replaced by 1-(1,4-benzodioxan-2-yl)-2-isopropylaminoethanol hydrochloride (M.P. 144–145° C.), or by 1-(1,4-benzodioxan-2-yl)-2-t-butylaminoethanol hydrochloride (M.P. 162–163° C.), or by 1-(1,4-benzodioxan-2-yl)-2-t-butylaminoethanol hydrochloride (M.P. 193–194° C.), and in a similar manner there are obtained compositions which are suitable for oral use for therapeutic purposes.

*Example 5*

200 parts of coconut oil, 780 parts of arachis oil and 20 parts of beeswax are melted together at a temperature not exceeding 100° C., and 0.75 part of propyl gallate is then added and dissolved by stirring. The oily solution is stirred and allowed to cool to ambient temperature. 0.4 part of 1-(1,4-benzodioxan-2-yl)-2-isopropylaminoethanol hydrochloride (M.P. 180–181° C.), 40 parts of icing sugar and 0.6 part of saccharin sodium are mixed together for 10 minutes, and 58.6 parts of the abovementioned oily solution are added slowly with continual stirring. A suitable flavouring agent is added, and mixing is continued for 30 minutes. There is thus obtained an oily suspension suitable for oral administration for therapeutic purposes.

The 1-(1,4-benzodioxan-2-yl)-2-isopropylaminoethanol hydrochloride of M.P. 180–181° C. is replaced by 1-(1,4-benzodioxan-2-yl)-2-isopropylaminoethanol hydrochloride (M.P. 144–145° C.), or by 1-(1,4-benzodioxan-2-yl)-2-t-butylaminoethanol hydrochloride (M.P. 162–163° C.), or by 1-(1,4-benzodioxan-2-yl)-2-t-butylaminoethanol hydrochloride (M.P. 193–194° C.), and in a similar manner there are obtained oily suspensions which are suitable for oral administration for therapeutic purposes.

*Example 6*

A solution of 0.1 part of 1-(1,4-benzodiozan-2-yl)-2-isopropylaminoethanol hydrochloride (M.P. 180–181° C.) in 100 parts of distilled water is filled into ampoules. The ampoules are sealed and then heated at 115° C. for 30 minutes. There are thus obtained ampoules containing a sterile aqueous solution suitable for parenteral administration for therapeutic purposes.

The above process is repeated except that a solution of 0.1 part of sodium metabisulphite and 0.1 part of 1-(1,4-benzodioxan-2-yl)-2-isopropylaminoethanol hydrochloride in 100 parts of distilled water is filled into ampoules and then treated as described above. There are thus obtained ampoules containing a sterile aqueous solution suitable for parenteral administration for therapeutic purposes.

The 1-(1,4-benzodioxan-2-yl)-2-isopropylaminoethanol hydrochloride of M.P. 180–181° C. is replaced by 1-(1,4-benzodioxan-2-yl)-2-isopropylaminoethanol hydrochloride (M.P. 144–145° C.), or by 1-(1,4-benzodioxan-2-yl)-2-t-butylaminoethanol hydrochloride (M.P. 162–163° C.), or by 1-(1,4-benzodioxan-2-yl)-2-t-butylaminoethanol hydrochloride (M.P. 193–194° C.), and in a similar manner there are obtained ampoules containing a sterile aqueous solution suitable for parenteral administration for therapeutic purposes.

*Example 7*

A solution of 0.1 part of 1-(1,4-benzodioxan-2-yl)-2-isopropylaminoethanol hydrochloride (M.P. 180–181° C.) in 100 parts of distilled water is passed through a sterilising filter. The sterile filtrate is filled into sterile ampoules under aseptic conditions. There are thus obtained ampoules containing a sterile aqueous solution suitable for parenteral administration for therapeutic purposes.

The 1-(1,4-benzodioxan-2-yl)-2-isopropylaminoethanol hydrochloride of M.P. 180–181° C. is replaced by 1-(1,4-benzodioxan-2-yl)-2-isopropylaminoethanol hydrochloride (M.P. 144–145° C.), or by 1-(1,4-benzodioxan-2-yl)-2-t-butylaminoethanol hydrochloride (M.P. 162–163° C.), or by 1-(1,4-benzodioxan-2-yl)-2-t-butylaminoethanol hydrochloride (M.P. 193–194° C.), and in a similar manner there are obtained ampoules containing a sterile aqueous solution suitable for parenteral administration for therapeutic purposes.

*Example 8*

A mixture of 1 part of 1-(1,4-benzodioxan-2-yl)-2-isopropylaminoethanol (M.P. 88–89° C.), 40 parts of sucrose, 0.5 part of a cetyl alcohol-polyethylene oxide condensate, 1 part of polyvinylpyrrolidone, 0.25 part of methyl p-hydroxybenzoate and 100 parts of water is ball-milled for several hours. After the incorporation of suitable colouring and flavouring agents there is obtained a suspension suitable for oral administration for therapeutic purposes.

The 1-(1,4-benzodioxan-2-yl)-2-isopropylaminoethanol of M.P. 88–89° C. is replaced by 1-(1,4-benzodioxan-2-yl)-2-isopropylaminoethanol (M.P. 56–57° C.), or by 1 - (1,4 - benzodioxan-2-yl)-2-t-butylaminoethanol (M.P. 104–105° C.), or by 1-(1,4-benzodioxan-2-yl)-2-t-butylaminoethanol (M.P. 91–92° C.), or by 1-(1,4-benzodioxan - 2 - yl) - 2 - (1,1-dimethyl-2-phenylethylamino) ethanol hydrochloride (M.P. 237–238° C.), or by 1-(1,4-benzodioxan-2-yl)-2-(1,1 - dimethyl-2-phenylethylamino) ethanol hydrochloride (M.P. 196–197° C.), and in a similar manner there are obtained suspensions suitable for oral administration for therapeutic purposes.

Example 9

200 parts of 1-(1,4-benzodioxan-2-yl)-2-isopropylaminoethanol (M.P. 88–89° C.) are milled to a fine powder, sterilised by heating at 120° C. for 3 hours, and then mixed with 20 parts of sterile, finely-powdered sodium carboxymethylcellulose. The resulting powder is thoroughly mixed together with 100 parts of a sterile 2% solution of polyoxyethylene sorbitan mono-oleate in water, and the resulting mixture is dried. The dry, sterile product is introduced into vials which are then sealed. Addition of sterile water to the powder, followed by shaking, produces a suspension suitable for intramuscular injection for therapeutic purposes.

The 1-(1,4-benzodioxan-2-yl)-2-isopropylaminoethanol of M.P. 88–89° C. is replaced by 1-(1,4-benzodioxan-2-yl)-2-isopropylaminoethanol (M.P. 56–57° C.), or by 1 - (1,4 - benzodioxan-2-yl)-2-t-butylaminoethanol (M.P. 104–105° C.), or by 1-(1,4-benzodioxan-2-yl)-2-t-butylaminoethanol (M.P. 91–92° C.), or by 1-(1,4-benzodioxan-2-yl) - 2 - (1,1 - dimethyl - 2 - phenylethylamino) ethanol hydrochloride (M.P. 237–238° C.), or by 1-(1,4-benzodioxan-2-yl)-2-(1,1 - dimethyl-2-phenylethylamino) ethanol hydrochloride (M.P. 196–197° C.), and in a similar manner there are obtained suspensions suitable for intramuscular injection for therapeutic purposes.

What we claim is:

1. A method for effecting β-adrenergic blockade which comprises administering to a human in need of β-adrenergic blockade an effective amount of at least one 1,4-benzodioxan derivative selected from the group consisting of compounds of the formula:

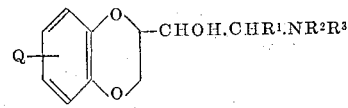

wherein $R^1$ is hydrogen or alkyl of 1–6 carbon carbon atoms; $R^2$ is hydrogen or alkyl of 1–6 carbon atoms; $R^3$ is hydrogen, or alkyl, hydroxyalkyl, alkoxyalkyl, cycloalkyl and alkenyl of 1–10 carbon atoms, aralkyl and haloaralkyl of 1–15 carbon atoms and alkoxy-aralkyl of 1–20 carbon atoms, or $R^2$ and $R^3$ taken together with the adjacent nitrogen atom form a 5- or 6-membered nitrogen-containing heterocyclic ring; and Q is halogen, alkyl of 1–6 carbon atoms or hydroxy, and the esters and salts of said compounds.

2. The method of claim 1 wherein said derivative is 1-(1,4-benzodioxan-2-yl)-2-isopropylaminoethanol.

3. The method of claim 1 wherein said derivative is 1-(1,4-benzodioxan-2-yl)-2-t-butylaminoethanol.

4. The method of claim 1 wherein the 1,4-benzodioxan derivative is administered by injection.

5. The method of claim 4 wherein said derivative is selected from the group consisting of 1-(1,4-benzodioxan-2-yl)-2-ethylaminoethanol, 1 - (1,4-benzodioxan-2-yl)-2-diethylaminoethanol, 1-(1,4-benzodioxan - 2 - yl) - 2 - n-propylaminoethanol, 1-(1,4-benzodioxan-2-yl)-2-pyrrolidinoethanol, 2-amino-1-(1,4-benzodioxan-2-yl)-propan-1-ol, 1-(1,4-benzodioxan-2-yl)-2-ethylaminopropan-1-ol, 1-(1,4-benzodioxan-2-yl)-2-diethylaminopropan-1-ol, 1-(1,4 - benzodioxan - 2 - yl) - 2 - cyclopentylaminopropan-1-ol, 1-(1,4-benzodioxan-2-yl)-2-pyrrolidinopropan-1-ol, 1-(1,4-benzodioxan-2 - yl) - 2 - isopropylaminoethanol of M.P. 56–67° C., 1-(1,4-benzodioxan-2-yl)-2-(1,1-dimethyl-2-phenylethylamino)ethanol, 1-(1,4-benzodioxan-2-yl)-2-(1-methyl-3-phenylpropylamino)ethanol, 1-(6- or 7 - bromo - 1,4-benzodioxan-2-yl)-2-t-butylaminoethanol, 1(1,4-benzodioxan-2-yl)-2-s-butylaminoethanol, 1 - (1,4-benzodioxan-2-yl)-2-isopropylaminopropan-1-ol, 1-(1,4-benzodioxan - 2 - yl)-2-n-butylaminopropan-1-ol, 1-(1,4-benzodioxan-2-yl)-2-t-butylaminoethyl benzoate, and the nontoxic, pharmaceutically acceptable salts thereof.

6. The method of claim 1 wherein the 1,4-benzodioxan derivative is administered orally.

7. The method of claim 6 wherein said derivative is selected from the group consisting of 1-(1,4-benzodioxan-2 - yl)-2-ethylaminoethanol, 1-(1,4-benzodioxan-2-yl)-2-diethylaminoethanol, 1 - (1,4 - benzodioxan - 2 - yl)-2-n-propylaminoethanol, 1-(1,4-benzodioxan-2-yl)-2-pyrrolidinoethanol, 2-amino-1-(1,4-benzodioxan-2-yl)-propan-1-ol, 1-(1,4-benzodioxan-2-yl)-2-ethylaminopropan - 1 - ol, 1-(1,4-benzodioxan-2-yl) - 2 - diethylaminopropan-1-ol, 1-(1,4-benzodioxan-2-yl) - 2 - cyclopentylaminopropan-1-ol, 1-(1,4-benzodioxan-2-yl)-2-pyrrolidinopropan-1-ol, 1-(1,4 - benzodioxan - 2 - yl)-2-isopropylaminoethanol of M.P. 56–57° C., 1-(1,4-benzodioxan-2-yl)-2-(1,1-dimethyl-2-phenylethylamino)ethanol, 1-(1,4-benzodioxan-2-yl)-2-(1-methyl-3-phenylpropylamino)ethanol, 1-(6- or 7 - bromo - 1,4-benzodioxan-2-yl)-2-t-butylaminoethanol, 1-(1,4-benzodioxan-2-yl)-2-s-butylaminoethanol, 1-(1,4-benzodioxan-2-yl)-2-isopropylaminopropan-1-ol, 1-(1,4-benzodioxan - 2 - yl)-2-n-butylaminopropan-1-ol, 1-(1,4-benzodioxan-2-yl)-2-t-butylaminoethyl benzoate, and the nontoxic, pharmaceutically acceptable salts thereof.

References Cited by the Examiner

Chemical Abstracts, vol. 52, 16356 and 16357 (1952).
Chemical Abstracts, vol. 52, 6352 (1952).

LEWIS GOTTS, *Primary Examiner.*

JULIAN S. LEVITT, *Examiner.*

MARTIN J. COHEN, RICHARD L. HUFF,
*Assistant Examiners.*